United States Patent

Tanigawa

[11] Patent Number: 5,560,879
[45] Date of Patent: Oct. 1, 1996

[54] METHOD FOR PRODUCING A WEAR-DETECTING PROBE FOR A BRAKE LINING MATERIAL

[75] Inventor: Fumiyoshi Tanigawa, Mie-ken, Japan

[73] Assignee: Sumitomo Wiring Systems Ltd., Mie-ken, Japan

[21] Appl. No.: 297,010

[22] Filed: Aug. 29, 1994

Related U.S. Application Data

[63] Continuation of Ser. No. 991,742, Dec. 17, 1992, abandoned.

[30] Foreign Application Priority Data

Dec. 19, 1991 [JP] Japan ..................... 3-355254

[51] Int. Cl.$^6$ .......................... B29C 45/14; B29C 45/36
[52] U.S. Cl. .................. 264/138; 264/263; 264/275; 249/93
[58] Field of Search ................... 264/242, 250, 264/251, 259, 275, 278, 138, 272.11, 272.15, 249; 29/418; 425/129.1; 249/93, 94

[56] References Cited

U.S. PATENT DOCUMENTS

| | | | |
|---|---|---|---|
| 1,717,950 | 6/1929 | Summers | 249/93 |
| 2,454,193 | 11/1948 | Martin | 249/94 |
| 4,286,001 | 8/1981 | Frau | 264/250 |
| 4,354,995 | 10/1982 | Wiechard | 264/250 |
| 4,524,516 | 6/1985 | Wiechard | 264/250 |
| 4,857,253 | 8/1989 | Candle et al. | 264/242 |
| 5,174,942 | 12/1992 | Barnadas | 264/278 |
| 5,274,918 | 1/1994 | Reed | 29/418 |

FOREIGN PATENT DOCUMENTS

| | | | |
|---|---|---|---|
| 815168 | 9/1951 | Germany | 249/93 |
| 55-149434 | 11/1980 | Japan . | |

OTHER PUBLICATIONS

Japanese Unexamined Utility Model Publication No. 62–97332, Jun. 20, 1987.

*Primary Examiner*—Jan H. Silbaugh
*Assistant Examiner*—Angela Ortiz
*Attorney, Agent, or Firm*—Sughrue, Mion, Zinn, Macpeak & Seas

[57] ABSTRACT

An object is to accurately set an end of a detection conductor of a wear-detection probe for a brake lining material at a predetermined position in a housing. The wear-detection probe is produced by the steps of: connecting a detection conductor 1 to a positioning member 3 at a given position, the positioning member being electrically insulated from the detection conductor 1; fixing a securing portion 31 formed on the positioning member 3 on a work table at a given position with respect to a mold; forming a resin housing 4 containing a part of the positioning member 3 in the mold so that a detector 1a of the detection conductor 1 is inserted in the housing 4 and the securing portion 31 is projected from the housing 4; and removing the positioning member 3 including the securing portion 31 which is projected from the housing 4. It is thereby possible to reliably detect a wear limit of a brake lining material by means of the probe,

1 Claim, 5 Drawing Sheets

METHOD FOR PRODUCING A WEAR-DETECTING PROBE FOR A BRAKE LINING MATERIAL

This is a Continuation of application Ser. No. 07/991,742 filed Dec. 17, 1992now abandoned.

BACKGROUND OF THE INVENTION

1. Field of the Invention

This inventions relates to a method for producing a wear-detection probe for a brake lining material in a vehicle such as a motorcar.

2. Statement of the Prior Art

A brake for a vehicle generates a braking force by pressing a lining material such as a shoe lining in a drum brake or a brake pad in a disc brake on a rotor. It is possible to improve the safety of the brake by detecting the amount of wear of the lining material and generating a warning signal before the lining material has been overworn.

As means for detecting a usable limit of brake lining material with respect to wear, there is a contact type device which has a probe provided in or near the brake lining material with a conductor which is contacted with the rotor when the brake lining is worn by a predetermined amount and which turns on a warning light to indicate wear of the lining material when the conductor is contacted with the rotor.

For convenience of explanation, a conventional contact type wear-detection probe 100 for brake lining material will be described below by referring to FIG. 10.

The probe 100 comprises a detection part 101a having an end face of a detection conductor 101 connected to a controller (not shown) and a housing 102, made of a resin material, for receiving the detection part 101. The probe 100 is secured to a back metal D of a brake lining material C with the detection part 101a being inserted into the brake lining material C. In the probe 100 shown in FIG. 10, the detection part 101a is contacted with a rotor R which rotates by wheels and then conducts an electrical current to the controllers when the brake lining material C is worn by a given amount.

However, it was very difficult in the conventional contact type wear-detection probe to properly place the detection part 101a having the end face of the detection conductor 101 at the predetermined position in the housing 102, since the detection conductor 101 made of electrical wire is inserted into the housing 102. It will be impossible to accurately detect the time when the residual thickness of the brake lining material reaches a predetermined wear limit if the detection part 101a is not disposed at the predetermined position. Accordingly, the conventional probe has had a problem with reliability.

In addition, the detection conductor 101 has a tendency to incline and readily fall out of the housing 102 it is merely inserted in the housing 102.

SUMMARY OF THE INVENTION

An object of the present invention is to provide a method for producing a contact type wear-detection probe for a brake lining material, which has a high reliability on detection and can accurately detect a predetermined residual thickness of a worn brake lining material.

Another object of the present invention is to prevent a detection conductor of a produced wear-detection probe from readily falling out of a housing.

In order to achieve the above objects a method for producing a wear-detection probe for a brake lining material wherein a detection conductor is contacted with a rotor when a predetermined thickness remains in the brake lining material due to wear, in accordance with the present invention, comprising the steps of:

connecting a detection conductor to a positioning member at a given position, said positioning member being electrically insulated from said detection conductor;

fixing a securing portion formed on said positioning member on a work table: at a given position with respect to a mold;

forming a resin housing containing a part of said positioning member in said mold so that an end of said detection conductor is inserted in said housing and said securing portion is projected from said housing; and removing said positioning member including said securing portion which is projected from said housing.

In the above method of producing the probe, the detection conductor is formed into a linear shape and said positioning member is provided with a flat piece perpendicular to the longitudinal axis of said detection conductor at the position to be inserted in said housing.

According to the method of producing the probe of the present invention, it is possible to dispose the detection conductor at the given position in the housing, since the housing can be formed while the detection conductor to be contacted with the rotor is fixed at the given position by the positioning member.

In addition, the linear shaped detection conductor can be prevented from falling out of the housing by the positioning member which is coupled to the detection conductor and left in the housing.

DETAILED DESCRIPTION OF THE PREFERRED EMBODIMENTS:

Referring now to FIGS. 1 through 8, a method of producing a contact type wear-detection probe for a brake lining material of the present invention will be explained below.

The contact type wear-detection probe produced by the method of the present invention comprises a detection conductor 1, a positioning member 3, and a housing 4.

Figure 7:
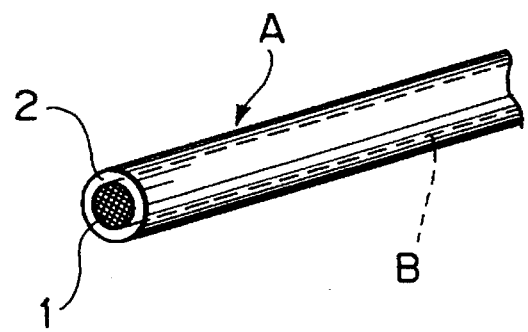
FIG. 7 is a perspective view of the detection conductor.

As shown in FIG. 7, the detection conductor 1 includes a sheath 2 made of an insulation material and a core B made of an electrical wire A. The electrical wire A is connected to a controller (not shown) of a wear-detection device including the probe.

Figure 8:
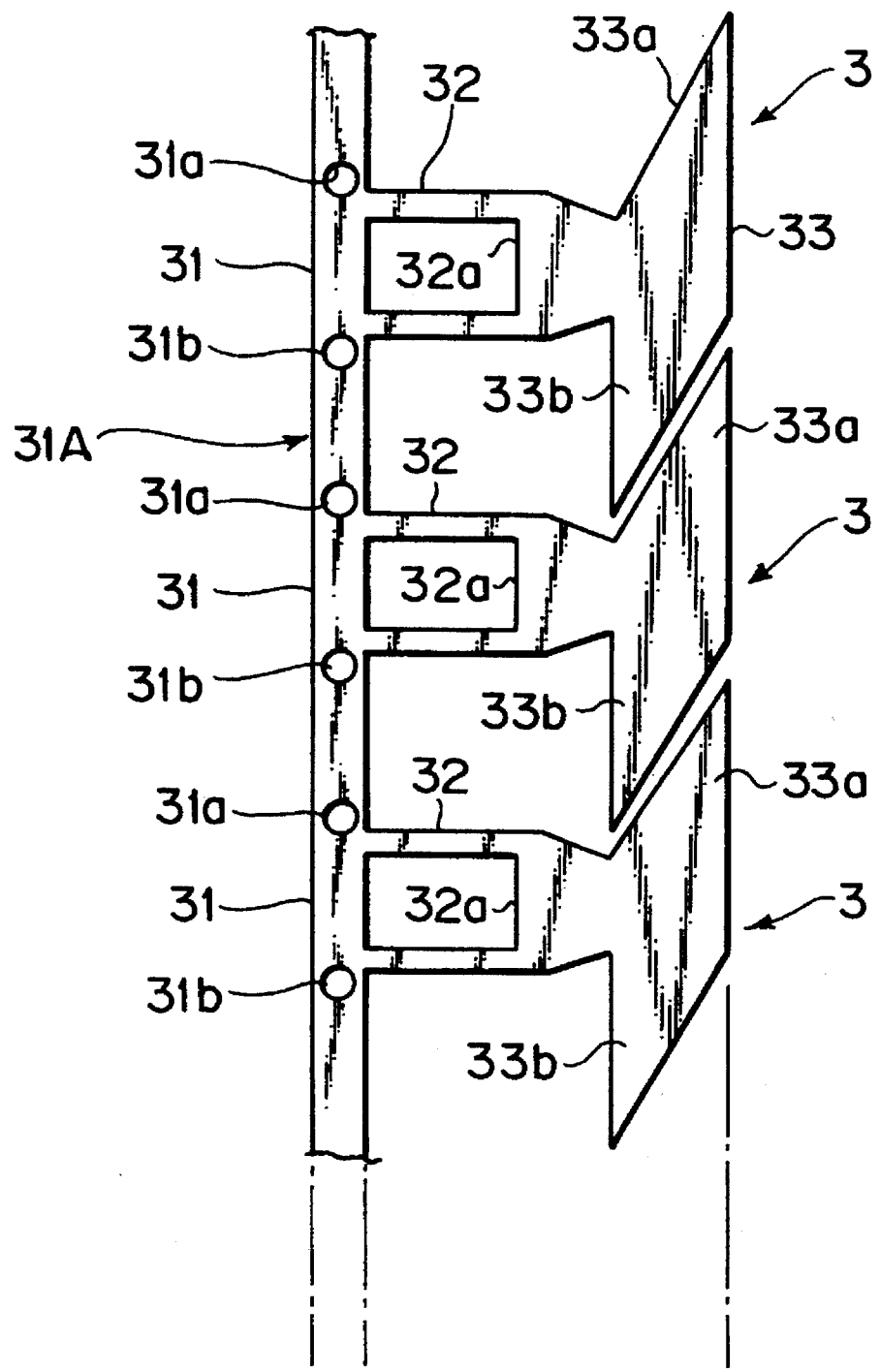
FIG. 8 is a plan view of a series of the positioning members.

FIG. 8 shows a series of the positioning members 3 each of which has a strip-like securing portion 31, a connecting portion 33, and a pair of coupling portions 32. These portions 31, 32, and 33 are integrally formed from a metal sheet. A plurality of positioning members 3 are in order formed by punching out from the metal sheet a carrier 31A including a plurality of securing portions 31 corresponding to the respective probes, and a plurality of coupling portions 32 and connecting portions 33 corresponding to the respective securing portions 31. Each of the securing portions is provided with a pair of holes 31a and 31b corresponding to the connecting portions 33. Each pair of holes 31a and 31b is formed in the same relative position with respect to each positioning member 3. The positioning member 3 is provided at the coupling portions 32 with a flat piece 32a parallel to the longitudinal direction of the securing portion 31. The connecting portions 33 have triangular projection pieces 33a and 33b on the opposite sides thereof.

Figure 1:
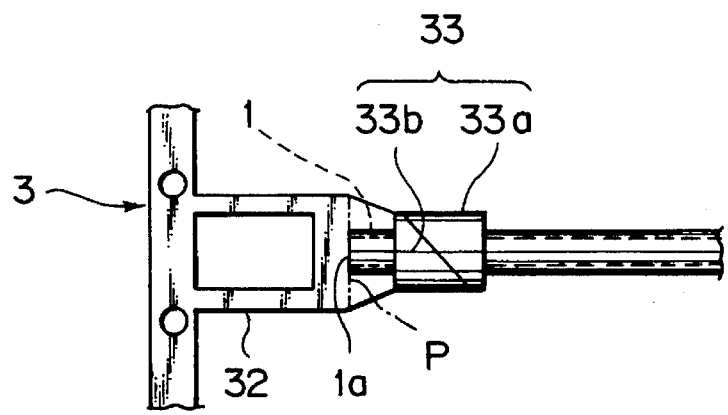
FIG. 1 is a plan view of a contact type wear-detection probe in which a detection conductor is coupled to a positioning member.
Figure 2:
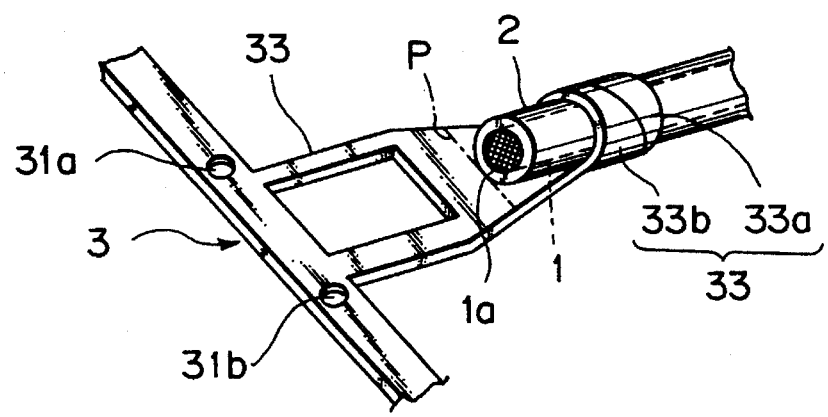
FIG. 2 is a perspective view of the probe shown in FIG. 1.

On producing the contact type wear-detection probe, as shown in FIGS. 1 and 2, first the detection conductor 1 is connected through the sheath 2 to the connecting portion 33 of the positioning member 3. That is, the triangular projection pieces 33a and 33b are wound around the sheath 2 on the detection conductor 1 so that the end face of the conductor 1 is disposed at the given position P on the positioning member 3 so as to define the detector 1a on the end face. In this case, since it is possible to set the detector 1a at the given position P on the positioning member 3 with the securing portion 33 holding the detection conductor 1 near the detector 1a, the positional relation between the detector 1a and the positioning member 3, or between the detector 1a and the projection pieces 31a and 31b, is always kept constant in any probes produced by the method of the present invention.

Figure 3:
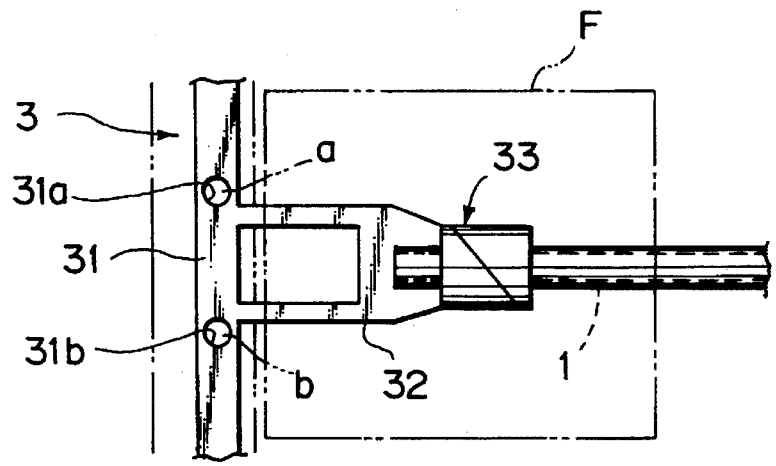
FIG. 3 is a plan view of the probe in which the positioning member is fixed at a given position on a work table.

Second, as shown in FIG. 3, the securing portion 31 of the positioning member 3 is fixed on a work table (not shown) at a given position with respect to a mold F for forming the housing 4. For example, a pair of protrusions a1 and b1 receive the pair of holes 31a and 31b in the positioning member 31 to fix the member 3 with respect to the mold on the work table.

Figure 4:
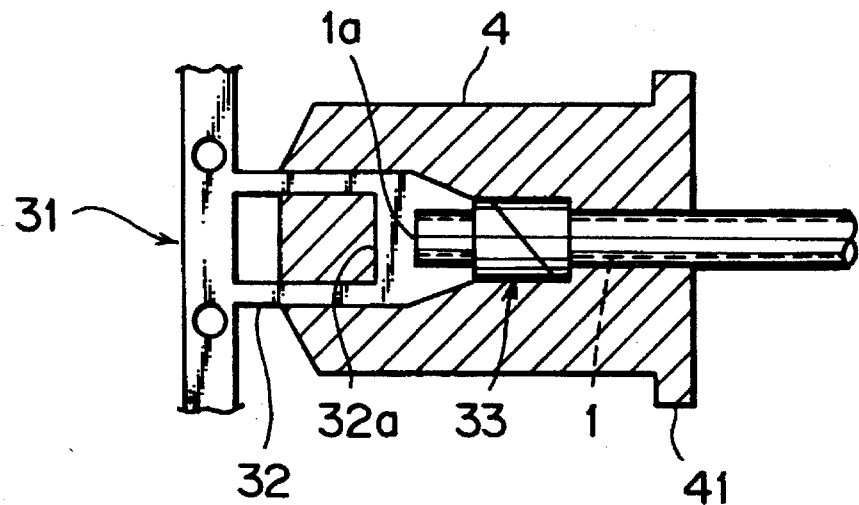
FIG. 4 is a longitudinal cross-sectional view of the probe in which a housing has been formed by a mold.

Third, as shown in FIG. 3, the detector 1a of the detection conductor 1 and the connecting portion 33, and the coupling portions 32 and the flat piece 32a of the positioning member are disposed in the mold F and then a resin material is poured into the mold F. As shown in FIG. 4, the housing 4 is molded in which the portions 32, 3, the pieces 32a and the detector 1a are embedded. The housing 4 has a flange 41 around the base end.

Figure 5:
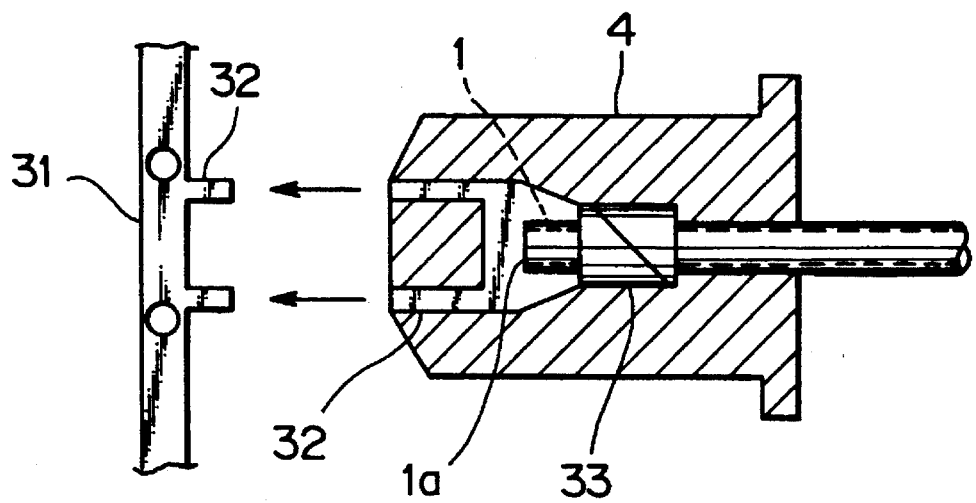
FIG. 5 is a longitudinal cross-sectional view of the probe in which the positioning member projected from the housing is cut off from the housing.

Finally, as shown in FIG. 5, the securing portion 31 and a part of the coupling portions 32 of the positioning member 3 which are projected from the molded housing 4 are cut off from the member 3 in the housing 4.

Figure 6:
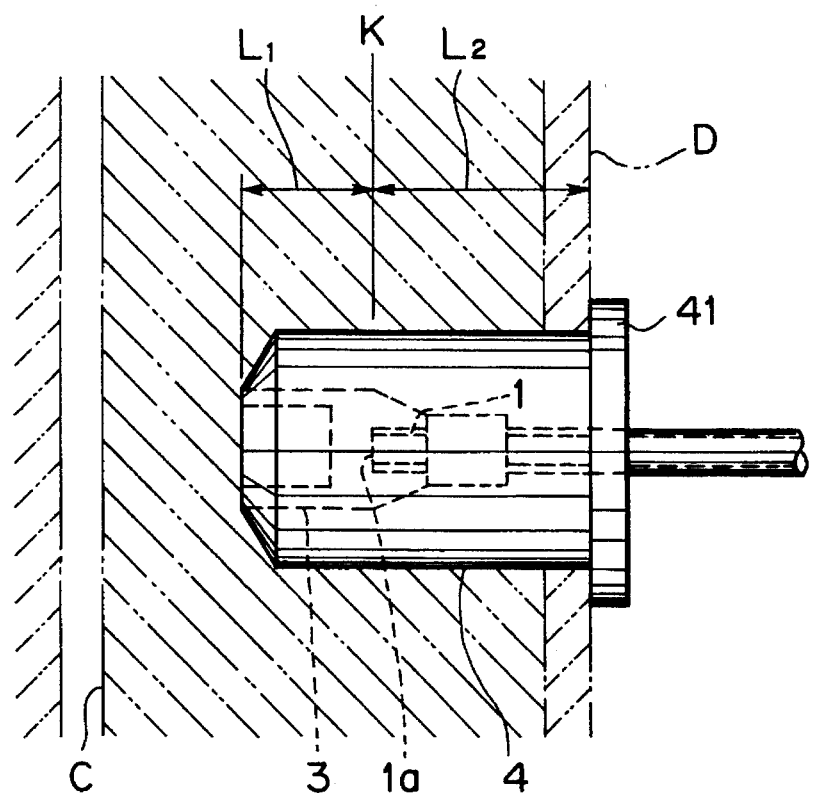
FIG. 6 is an explanatory view of the finished probe in use.

By the steps described above, the contact type wear-detection probe in which parts of the detection conductor 1 and the positioning member 3 are embedded in the resin housing 4 is produced as shown in FIG. 6.

In the contact type wear-detection probe shown in FIG. 6, the detector 1a is accurately set at a given position in the housing 4, since the probe is produced by fixing the detector 1a on the end face of the detection conductor 1 at the given position on the positioning member 3 and molding the housing 4 with the housing member 3 being fixed at the given position. That is, as shown in FIG. 6, the distance L1 from the top end of the housing 4 to the detector 1a and the distance L2 from the flange 41 of the housing 4 to the detector 1a are precisely set at given values. Accordingly, it is possible to accurately set the detector 1a at the given position corresponding to a wear limit of the brake pad C by inserting the top end of the contact type wear-detection probe into the brake pad (brake lining material) C shown by two-dot chain lines in FIG. 6 and fixing the flange 41 on a back metal D of the brake pad C.

Since the contact type wear-detection probe produced by the method described above by referring to FIGS. 1 through 6 has the detector 1a set at the given position in the housing thereby avoiding random detection, it is possible to accurately detect when the residual thickness of the brake lining material reaches the given amount due to wear.

Also, in the contact type wear-detection probe produced by the above method, the detection conductor 1 can be prevented from falling out of the housing 4 by the flat piece 32a of the positioning member 3 embedded in the housing 4 together with the detection conductor 1.

Figure 9A:
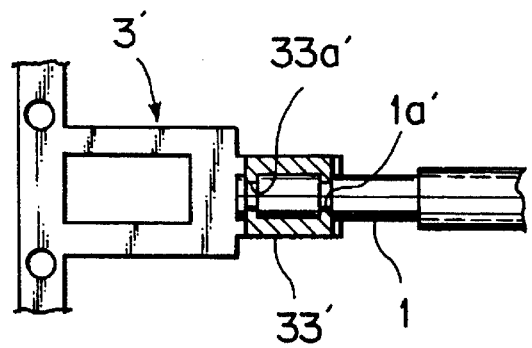
FIG. 9 shows an alternation of coupling between the detection conductor and the positioning member in the probe, FIGS. 9A and 9B being a plan view and a side view of the probe.
Figure 9B:
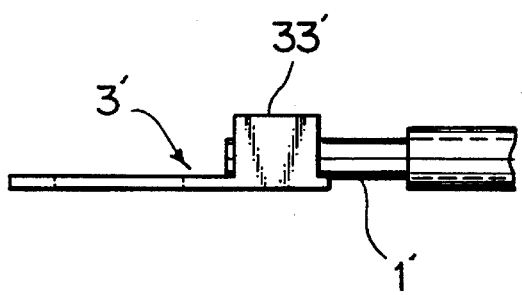
Figure 10:
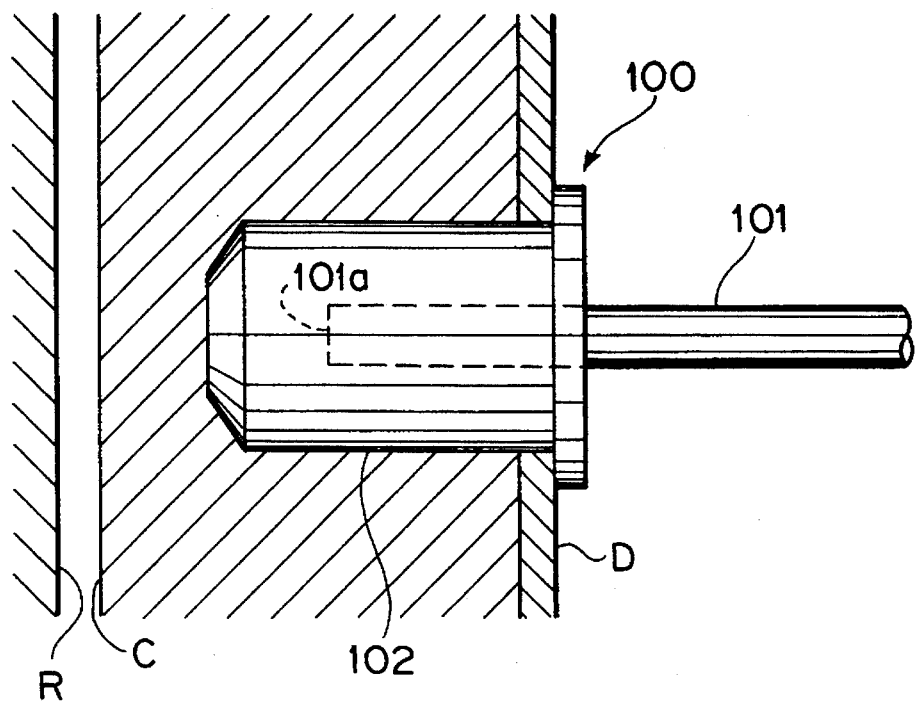
FIG. 10 is an explanatory view of a conventional contact type wear-detection probe in use.

Although the positioning member 3 made of the metal sheet is connected through the sheath 2 to the detection conductor 1 in the above embodiment, a detection conductor 1' may be connected to a positioning member 3' made of a resin material by mating a recess 1a' formed on an end of the detection conductor 1' with a protrusion 33a' formed on a connecting portion 33' of the positioning member 3' as shown in FIGS. 9A and 9B. Thus, if the positioning member 3' is made of a resin material, insulation material such as a sheath and the like need not be interposed between the positioning member 3' and the detection conductor 1'.

Also, the means for fixing the positioning member at the given position upon molding the housing are not limited to the means described in the above embodiment. For example, if the positioning member punched out of the metal sheet should be carried by a conveyor to the molding device which forms the housing, the positioning member can be fixed at the given position in relation to the molding device by stopping the conveyor at the given position in relation to the molding device.

The wear-detection probe produced by the method of the present invention may be applied to detection of wear of a shoe lining for a drum brake. This invention may also be applied to a disconnection type wear-detector which has a U-turned detection conductor and can detect the wear limit by disconnection of the U-turned portion.

According to the method of producing the wear-detection probe of the present invention, reliability of wear-detection is improved, since the detection conductor can be set at the given position in the housing. Further, the detection conductor is prevented from falling out of the housing.

What is claimed is:

1. A method for producing a wear-detection probe for a brake lining material wherein a detection conductor comprised of an electrically conductive core having an insulating sheath thereon is contacted with a rotor when a predetermined thickness remains in the brake lining material due to wear, comprising the steps of:

connecting a positioning member directly on an end portion of said detection conductor at a given position to provide a fixed connection;

fixing a securing portion formed on said positioning member on a work table at a given position adjacent to a mold with said securing portion and said conductor projecting from said mold and with said connection located within said mold;

encapsulating said connection in said mold with resin to form a resin housing with the securing portion and conductor projecting therefrom; and removing the securing portion of said positioning member projecting from said housing; and wherein said detection conductor is formed into a linear shape and said positioning member is provided with a flat piece perpendicular to the longitudinal axis of said detection conductor at the connection in said housing, wherein said positioning member is formed of resin material and is connected directly on an end portion of said core having the sheath removed therefrom.

* * * * *